US008964536B2

(12) United States Patent
Sambhwani et al.

(10) Patent No.: US 8,964,536 B2
(45) Date of Patent: Feb. 24, 2015

(54) APPARATUS AND METHOD FOR DYNAMIC LOAD BALANCING IN A MULTI-CARRIER WIRELESS COMMUNICATION SYSTEM

(75) Inventors: Sharad D. Sambhwani, San Diego, CA (US); Bibhu P. Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 12/897,743

(22) Filed: Oct. 4, 2010

(65) Prior Publication Data

US 2011/0158089 A1 Jun. 30, 2011

Related U.S. Application Data

(60) Provisional application No. 61/248,863, filed on Oct. 5, 2009.

(51) Int. Cl.
*H04L 1/00* (2006.01)
*H04W 36/22* (2009.01)

(52) U.S. Cl.
CPC .................................. *H04W 36/22* (2013.01)
USPC ............ 370/230; 370/312; 370/437; 455/453

(58) Field of Classification Search
CPC ..... H04W 36/00; H04W 36/06; H04W 36/22; H04W 36/28; H04W 36/30; H04W 36/0083; H04W 28/08; H04W 76/048; H04W 76/04; H04W 76/064; H04W 72/04
USPC ......... 370/264, 265, 270, 271, 278–282, 302, 370/311, 313–318, 395, 230–234, 310, 312, 370/328–336, 338–347, 436–437, 441; 455/436, 420, 522, 450–453
See application file for complete search history.

(56) References Cited

U.S. PATENT DOCUMENTS 6,405,038 B1 * 6/2002 Barber et al. ................. 455/434
7,738,903 B2 * 6/2010 Chen et al. .................... 455/522
(Continued)

FOREIGN PATENT DOCUMENTS

CN    101098326 A    1/2008
JP    2008109406 A    5/2008
(Continued)

OTHER PUBLICATIONS

International Search Report and Written Opinion—PCT/US2010/051529, International Search Authority—European Patent Office—Feb. 10, 2011.

*Primary Examiner* — Andrew Chriss
*Assistant Examiner* — Rasha Fayed

(57) ABSTRACT

An apparatus and method enables a dynamic change from one carrier to another in a wireless telecommunication system. In one example, user equipment receives a preconfiguration message adapted to enable the user equipment to be preconfigured for an initial carrier and a subsequent carrier. Here, the user equipment initially communicates over an air interface utilizing the initial carrier frequency. Upon the satisfaction of certain conditions, such as one of the initial carriers being heavily loaded or nearing its capacity, a Node B provides an order to the user equipment to switch from its initial carrier to the secondary carrier, which was preconfigured. In this way, relatively rapid carrier switching provides for enhanced load balancing largely controlled by the Node B.

18 Claims, 8 Drawing Sheets

(56) References Cited

U.S. PATENT DOCUMENTS

| | | | |
|---|---|---|---|
| 7,860,511 B1* | 12/2010 | Fong et al. | 455/453 |
| 8,165,026 B2* | 4/2012 | Gholmieh et al. | 370/241 |
| 8,204,025 B2* | 6/2012 | Cai et al. | 370/337 |
| 8,325,640 B2* | 12/2012 | Park et al. | 370/311 |
| 8,433,352 B2* | 4/2013 | Budic | 455/509 |
| 2004/0001429 A1* | 1/2004 | Ma et al. | 370/210 |
| 2004/0156495 A1* | 8/2004 | Chava et al. | 379/392 |
| 2006/0013182 A1* | 1/2006 | Balasubramanian et al. | 370/343 |
| 2007/0002812 A1* | 1/2007 | Malkamaki et al. | 370/338 |
| 2007/0019589 A1* | 1/2007 | Attar et al. | 370/335 |
| 2007/0042798 A1 | 2/2007 | Chen et al. | |
| 2009/0316575 A1* | 12/2009 | Gholmieh et al. | 370/225 |
| 2010/0222059 A1* | 9/2010 | Pani et al. | 455/436 |
| 2011/0170519 A1* | 7/2011 | Zhang et al. | 370/331 |

FOREIGN PATENT DOCUMENTS

| | | |
|---|---|---|
| JP | 2008546268 A | 12/2008 |
| JP | 2009525656 A | 7/2009 |
| JP | 2009225320 A | 10/2009 |
| WO | 2006126079 A2 | 11/2006 |
| WO | WO-2007088468 A2 | 8/2007 |

\* cited by examiner

APPARATUS AND METHOD FOR DYNAMIC LOAD BALANCING IN A MULTI-CARRIER WIRELESS COMMUNICATION SYSTEM

CROSS-REFERENCE TO RELATED APPLICATION(S)

This application claims the benefit of U.S. Provisional Patent Application No. 61/248,863, entitled "Dynamic NodeB Based UL Load Balancing in 4C-HSDPA," filed on Oct. 5, 2009, which is expressly incorporated by reference herein in its entirety.

BACKGROUND

1. Field

Aspects of the present disclosure relate generally to wireless communication systems, and more particularly, to systems and methods for balancing traffic loading in multi-carrier wireless communication systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

An apparatus and method enables a dynamic change from one carrier to another in a wireless telecommunication system. In one example, user equipment receives a preconfiguration message adapted to enable the user equipment to be preconfigured for an initial carrier and a subsequent carrier. Here, the user equipment initially communicates over an air interface utilizing the initial carrier frequency. Upon the satisfaction of certain conditions, such as one of the initial carriers being heavily loaded or nearing its capacity, a Node B provides an order to the user equipment to switch from its initial carrier to the secondary carrier, which was preconfigured. In this way, relatively rapid carrier switching provides for enhanced load balancing largely controlled by the Node B.

In one aspect, the disclosure provides a method of wireless communication, including communicating over an anchor carrier and at least one initial secondary carrier, receiving an order to change the at least one initial secondary carrier, and at least one of deactivating the at least one initial secondary carrier, or activating at least one subsequent secondary carrier, in response to the order.

Another aspect of the disclosure provides a method of wireless communication, including communicating over an anchor carrier and at least one initial secondary carrier, transmitting an order to change the at least one initial secondary carrier, and at least one of ceasing communication over the at least one initial secondary carrier, or activating at least one additional secondary carrier.

Yet another aspect of the disclosure provides an apparatus for wireless communication, including means for communicating over an anchor carrier and at least one initial secondary carrier, means for receiving an order to change the at least one initial secondary carrier, and means for at least one of deactivating the at least one initial secondary carrier, or activating at least one subsequent secondary carrier, in response to the order.

Still another aspect of the disclosure provides an apparatus for wireless communication, including means for communicating over an anchor carrier and at least one initial secondary carrier, means for transmitting an order to change the at least one initial secondary carrier, and means for at least one of ceasing communication over the at least one initial secondary carrier, or activating at least one additional secondary carrier.

Still another aspect of the disclosure provides a computer program product, including a computer-readable medium having code for communicating over an anchor carrier and at least one initial secondary carrier, receiving an order to change the at least one initial secondary carrier, and at least one of deactivating the at least one initial secondary carrier, or activating at least one subsequent secondary carrier, in response to the order.

Still another aspect of the disclosure provides a computer program product, including a computer-readable medium having code for communicating over an anchor carrier and at least one initial secondary carrier, transmitting an order to change the at least one initial secondary carrier, and at least one of ceasing communication over the at least one initial secondary carrier, or activating at least one additional secondary carrier.

Still another aspect of the disclosure provides an apparatus for wireless communication, including at least one processor and a memory coupled to the at least one processor. Here, the at least one processor is configured to communicate over an anchor carrier and at least one initial secondary carrier, receive an order to change the at least one initial secondary carrier, and at least one of deactivate the at least one initial secondary carrier, or activate at least one subsequent secondary carrier, in response to the order.

Still another aspect of the disclosure provides an apparatus for wireless communication, including at least one processor and a memory coupled to the at least one processor. Here, the at least one processor is configured to communicate over an anchor carrier and at least one initial secondary carrier, provide an order to change the at least one initial secondary carrier, and at least one of cease communication over the at least one initial secondary carrier, or activate at least one additional secondary carrier.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
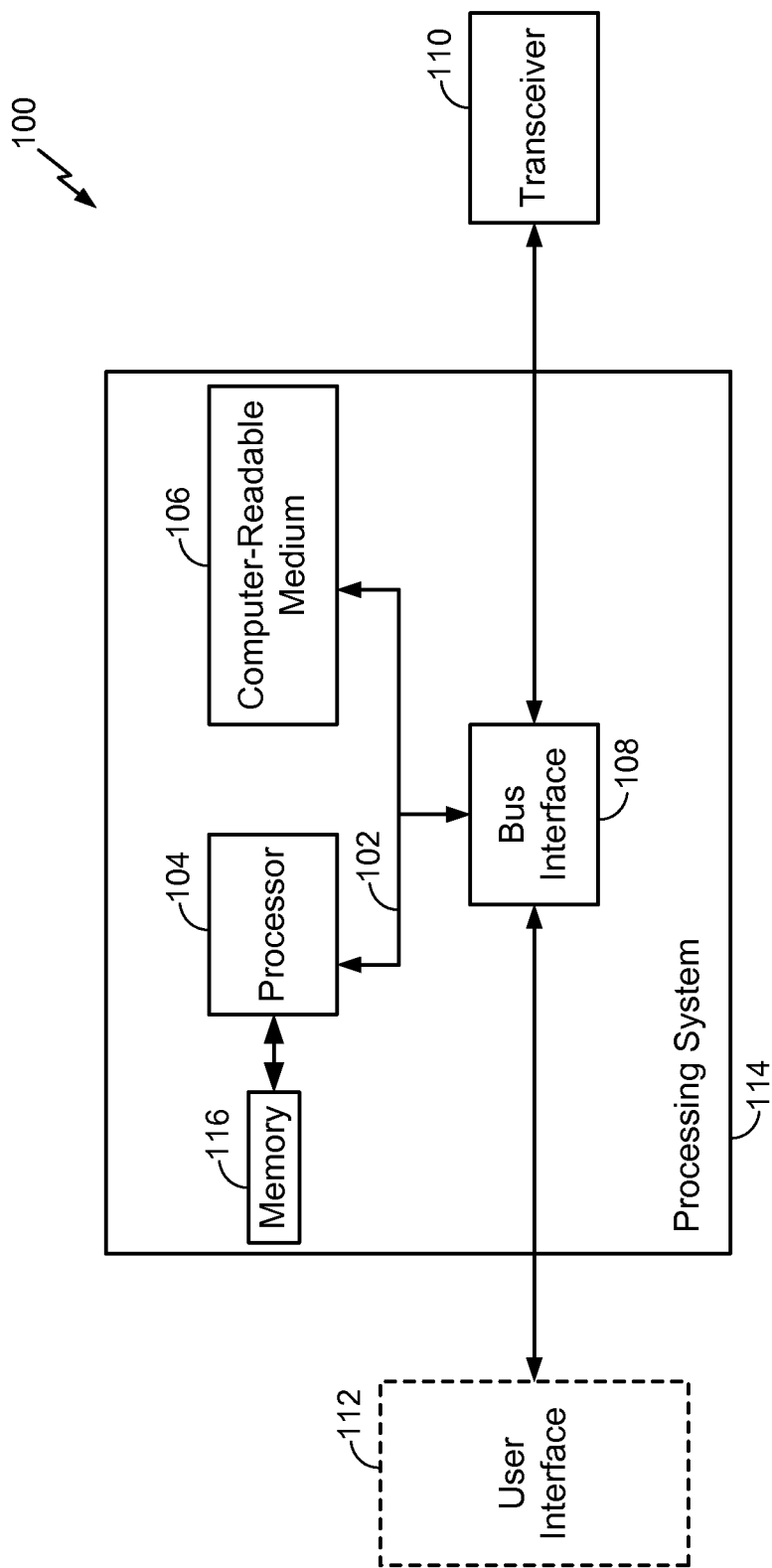
FIG. 1 is a diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, memory 116, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
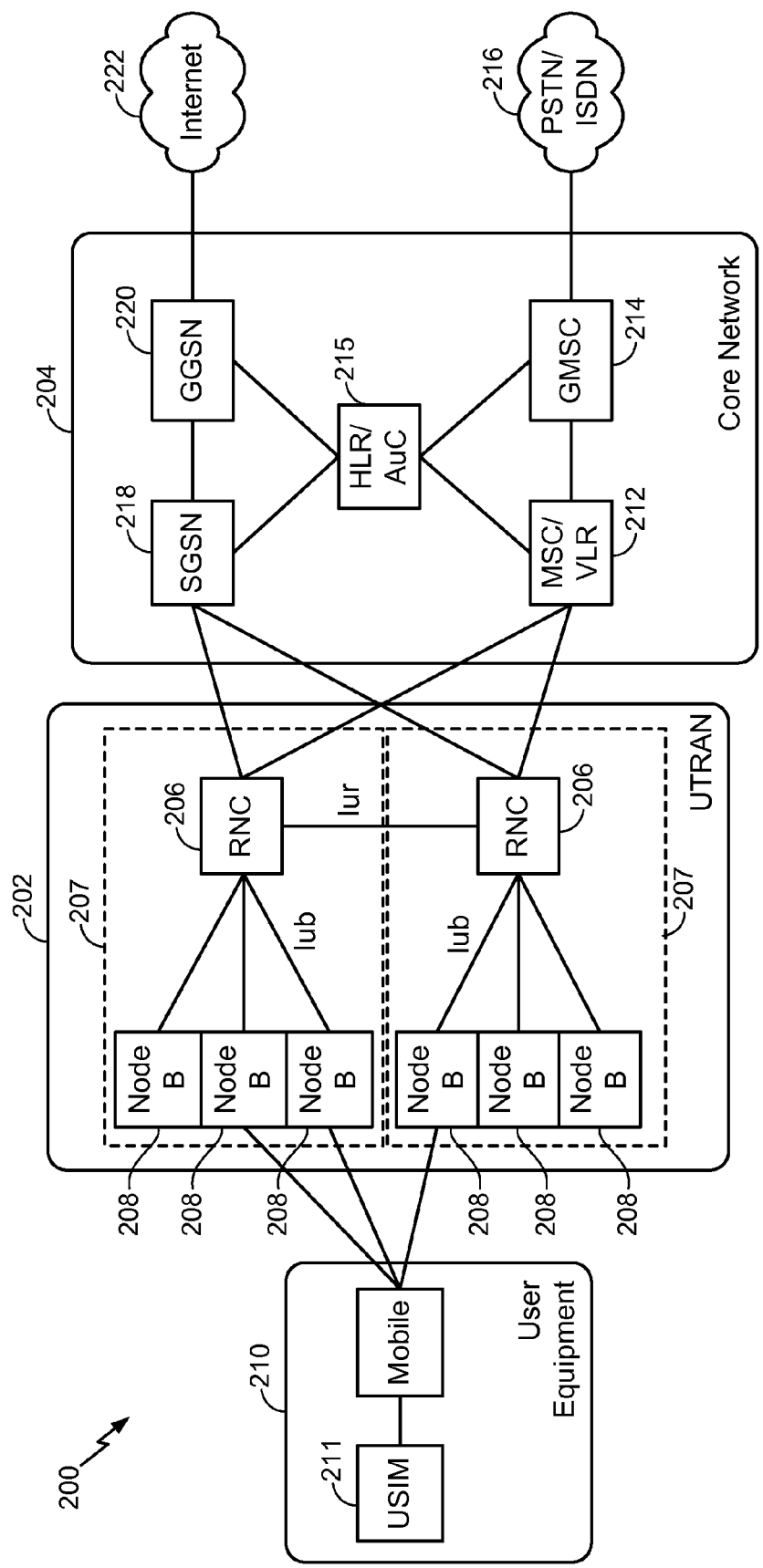
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs in the UTRAN 202 through various types of interfaces such as a direct physical connection, a virtual network, or the like, using any suitable transport network. For example, an Iur interface may connect RNCs 206 to one another, utilizing a radio network subsystem application part (RNSAP) protocol.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 may be communicatively coupled to the RNCs 206 in their respective RNS 207 by way of an Iub interface, utilizing any suitable communication protocol, for example, an Node B application part (NBAP) protocol. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a SGSN 218 and a GGSN 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different frequency for the UL and DL between a Node B 208 and a UE 210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 3:
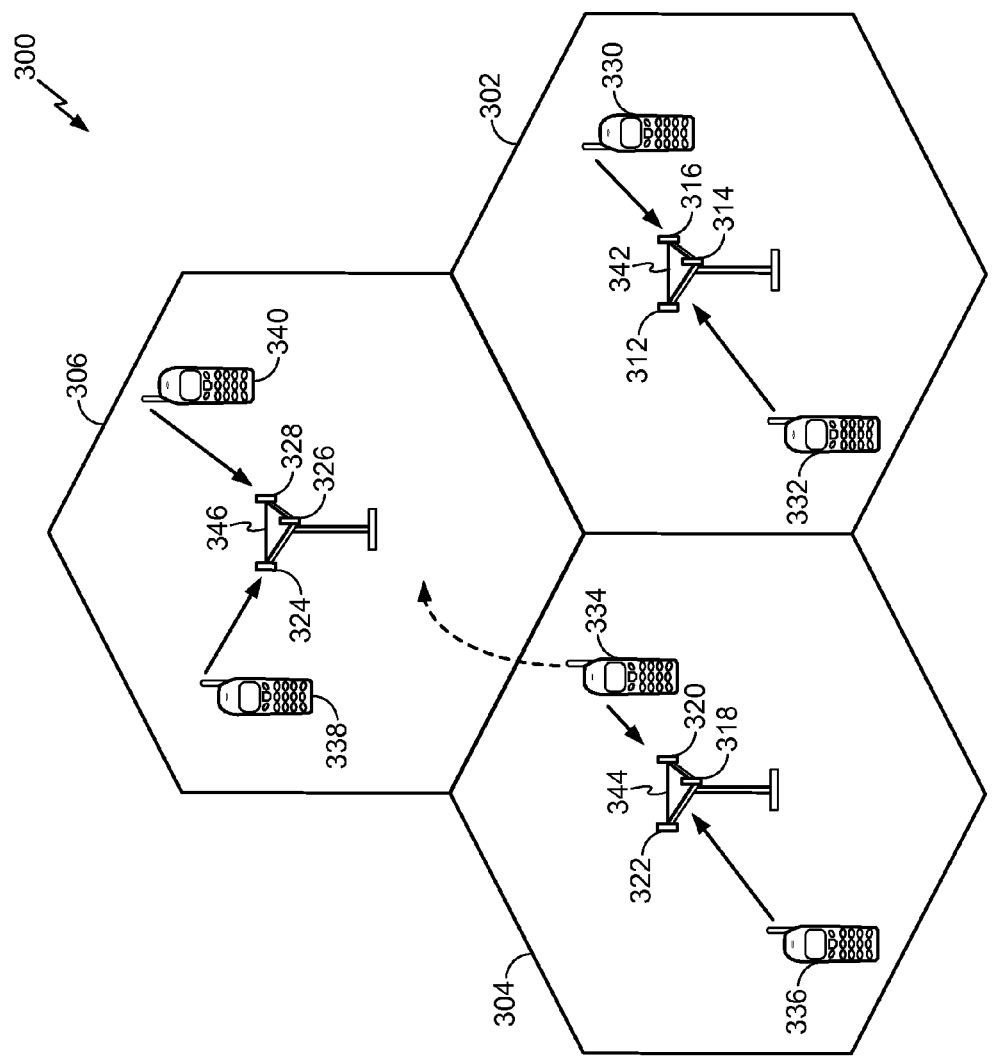
FIG. 3 is a conceptual diagram illustrating an example of an access network.

Referring to FIG. 3, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4:
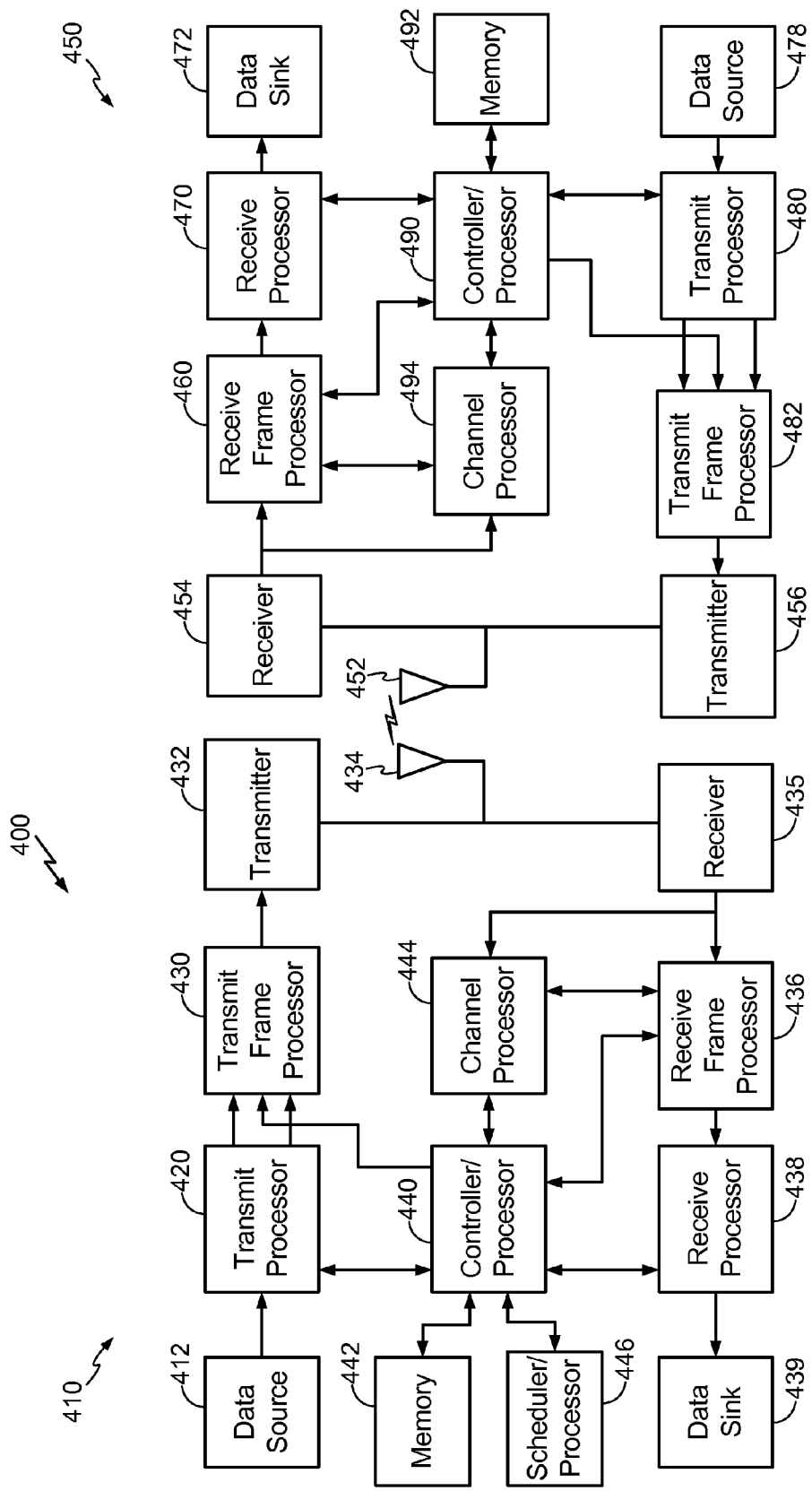
FIG. 4 is a block diagram conceptually illustrating an example of a Node B in communication with a UE in a telecommunications system.

FIG. 4 is a block diagram of a Node B 410 in communication with a UE 450, where the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule DL and/or UL transmissions for the UEs.

In modern High-Speed Packet Access (HSPA) systems capable of carrier aggregation in accordance with 3GPP specifications for UMTS, each of the UL and the DL may utilize more than one carrier frequency, although the number of carriers used for the DL may be different than the number of carriers used for the UL. An anchor carrier is a carrier that carries all the physical channels, including data and control channels. Each of the UL and DL typically has one anchor carrier. A supplemental or secondary carrier is any carrier that is not the anchor carrier, and typically carries less, if any, control information. Each of the UL and DL may have zero or more secondary carriers. In some examples, aggregated carrier frequencies are limited to adjacent carriers operating in the same frequency band. However, in other examples, a more flexible aggregation of carriers that can include non-adjacent carriers in the same frequency band and/or carriers in different frequency bands may be utilized.

In accordance with various aspects of the present disclosure, dynamic load balancing across multiple carriers may be achieved in HSPA networks by way of secondary carrier activation and deactivation. With a growing number of data devices and demand in UMTS networks, dynamic load balancing can provide an improved user experience for a given system capacity.

That is, a multi-carrier system inherently provides some level of load balancing, in that the amount of information carried on each carrier for each user can be increased and/or decreased as needed at each transmission time interval (TTI) to improve the load balance across the carriers. Here, further improvement to load balancing can be provided by enabling a UE to switch from a highly loaded carrier to a less highly loaded carrier. Moreover, preconfiguring a UE for the carrier to which the switch will take place can provide for rapid carrier switching (deactivation and activation) to improve performance during such a switch. Here, the switch (i.e., the activation to another secondary carrier) need not happen during a data transmission, but even if it happens during a data burst, the delay or interruption due to switching frequencies may still be small enough relative to the amount of time it takes to transmit the data burst by the user.

In one example, a UE configured to utilize two carriers can be enabled for dynamic load balancing by preconfiguring a third carrier frequency. That is, the UE may receive a preconfiguration message including an information element adapted to enable the UE to utilize any two of three carriers. The preconfiguration message may come from the RNC, and may take the form of an RRC reconfiguration message, an Active Set update message, or any other suitable message including an information element adapted to enable the UE to utilize the chosen carriers.

Here, in a dual carrier UE, the UE may only be enabled to be activated on two of the carriers at any given time. That is, although the UE has been provided preconfiguration information sufficient to enable the use of three carriers, the UE activates one anchor carrier and one secondary carrier. Upon the satisfaction of suitable conditions, such as a high loading condition on the carrier being utilized as the secondary carrier and a low loading condition on the third, inactive carrier, a Node B may provide an order to the UE to deactivate its secondary carrier and activate the third carrier as its new secondary carrier. The order may come from the Node B, and may take the form of an HS-SCCH order, or any other suitable message including an information element adapted to provide an instruction to the UE to change its carriers in accordance with its preconfiguration. The conditions upon which the determination to change the at least one secondary carrier may be based on a number of factors including a load imbalance among a plurality of carriers, uplink noise measurements, a downlink power, and/or the number of simultaneous connections utilizing the anchor carrier. Here, the load imbalance may be based on the traffic utilization on the plurality of carriers. The traffic utilization may be determined by analyzing what portion of transmission time intervals (TTIs) are empty on the plurality of carriers. That is, when a carrier is idle, the TTI may be empty for that portion of time. Thus, if certain carriers have a greater number of empty TTIs than other carriers, an order may be generated to better balance the load across the carriers.

Because a Node B may have more ready access to information about the loading of particular carriers, the Node B may be a more appropriate node to provide an order to particular UEs to switch their carrier frequencies, as opposed to other nodes such as an RNC. Moreover, when a Node B provides the order in the form of an HS-SCCH order, the UE can switch its secondary carrier in a shorter amount of time compared to the receipt of a higher-layer order from an RNC. Also, because the UE has been preconfigured for the new secondary carrier, it can switch to that carrier relatively quickly.

When utilizing frequency division duplexing, each of the UL carriers generally is within the same carrier frequency, separated by a duplexing distance, from a corresponding DL carrier. According to one aspect of the disclosure, a rule may be applied in which, in the case at least two UL carriers are activated, the secondary DL carrier corresponding to the secondary UL carrier may not be deactivated as long as the secondary UL carrier remains activated.

When it is an uplink carrier that is being switched, there may be additional issues to address. For example, the redirection of the secondary UL carrier may be due to a long term change in UL traffic load across carriers and thus, there may be a desire to retain the flexibility to allocate the best carrier at any time. Further, when switching a DL carrier, it is generally not necessary to preconfigure control channels such as the Fractional Dedicated Physical Channel (F-DPCH). The F-DPCH is a channel that carries power control information to control the UL. However, in an aspect of the disclosure, the F-DPCH may be preconfigured to enable dynamic UL carrier switching.

In some aspects of the disclosure, dynamic load balancing of UL carriers may be restricted to cases in which the secondary carrier or carriers are configured on either side of the anchor carrier. For example, in the case of three adjacent configured DL carriers (F1/F2/F3), F2 is the anchor carrier; and in the case of four adjacent configured DL carriers (F1/F2/F3/F4), either F2 or F3 is the anchor carrier. Here, the UE can be configured on three or four adjacent DL carriers, where the anchor carrier lies between two configured secondary carriers. The network can preconfigure the UE on three adjacent UL carriers that correspond to the anchor carrier and the carriers configured on either side of the anchor carrier. Thus, at any given time, the Node B may activate at most two of the UL carriers, subject to the condition that the two UL carriers are adjacent to one another. The UE then monitors the F-DPCH and the E-DCH control information in the activated downlink carriers corresponding to the activated uplink carriers. Due to mobility, the UE and the network may maintain Active Sets on each of the three preconfigured adjacent uplink carriers.

Aspects of the present disclosure are not limited to any particular number of carriers on either the uplink or the downlink, and further, are not limited to the switching of any number of carriers. For example, plural ones of the carriers may be switched upon the receipt of corresponding HS-SCCH orders. Further, one or more of each of the downlink and uplink carriers may be switched upon the receipt of corresponding HS-SCCH orders.

Figure 5:
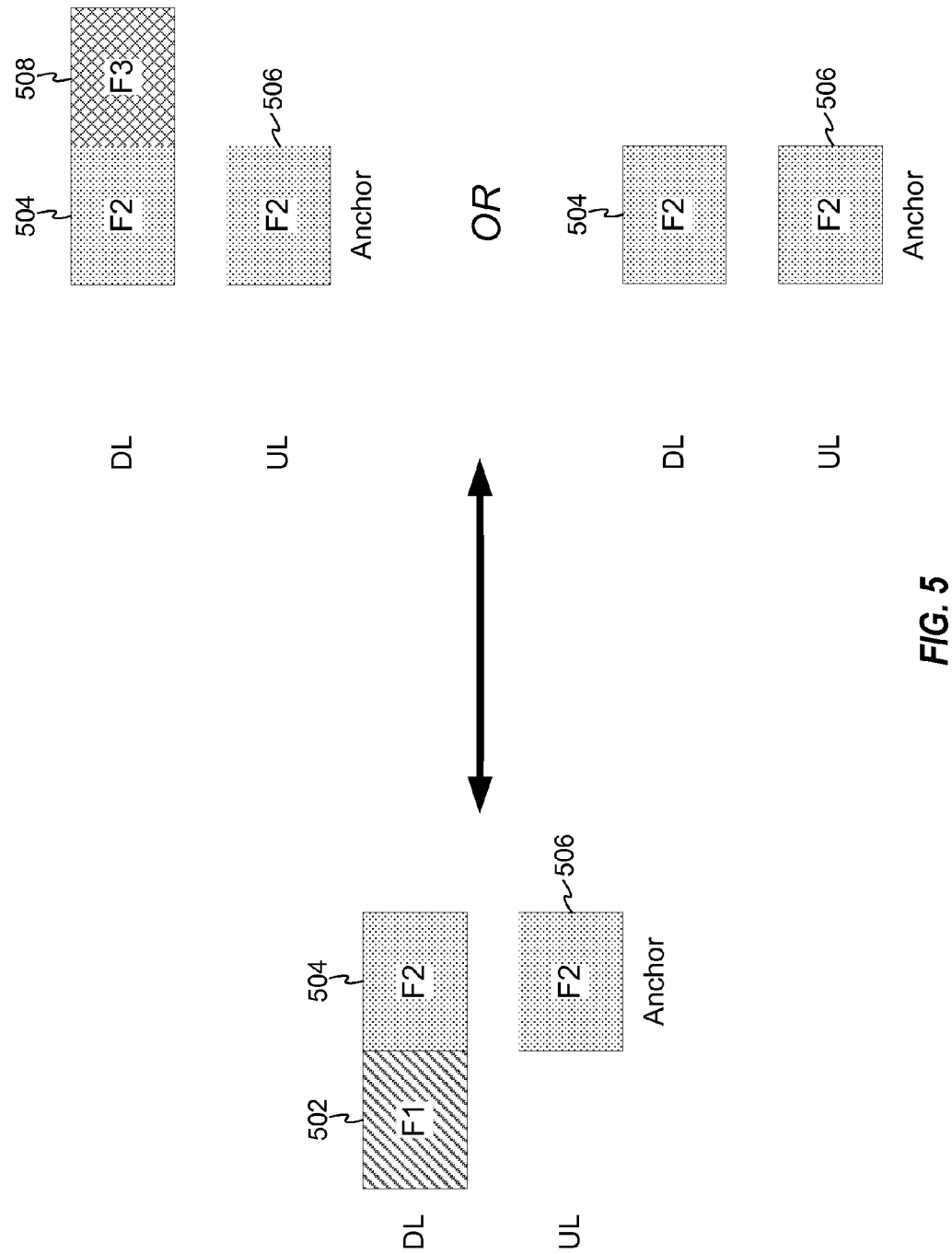
FIG. 5 is a conceptual diagram illustrating a dynamic downlink carrier change in a DC-HSDPA system.

In another aspect of the disclosure, dynamic load balancing may be implemented in UEs capable of only two downlink carriers and one uplink carrier, such as a DC-HSDPA-capable UE. For example, a UE may be preconfigured on three adjacent downlink carriers, where the anchor carrier lies between two configured secondary carriers. At any given time, the Node B has a choice to activate one of the two secondary serving HS-DSCH cells that lie adjacent to the serving HS-DSCH cell. For example, FIG. 5 is a conceptual diagram illustrating two alternatives for dynamically altering a traffic load on a downlink in a particular scenario. In the illustration, a carrier is illustrated by a block, with different carriers being designated by labels such as DL for downlink carriers, UL for uplink carriers, and Fn, where n represents an arbitrary number that does not necessarily correspond to an actual frequency of the respective carrier.

The implementation of the switching may be accomplished by utilizing a data structure such as an indexed table that includes allowable combinations of activated uplink and downlink carriers, and allowable configurations of configured uplink and downlink carriers. Here, as an example, the table for a UE capable of supporting four downlink carriers and two uplink carriers can include entries for the configuration of four to six downlink carriers, and two to four uplink carriers. Further, the table can include entries for the activation of any suitable number up to four of the downlink carriers and any suitable number up to two of the uplink carriers. In this way, the UE can be preconfigured for one, two, or three uplink carriers, wherein there are two possible groups of three adjacent uplink carriers out of the four possible uplink carriers in the table that can be preconfigured. Similarly, the UE can be preconfigured for one to five downlink carriers, wherein there are two possible groups of five adjacent downlink carriers in the table that can be preconfigured. Once the UE is preconfigured for the desired carrier frequencies in accordance with RRC signaling as described above, an HS-SCCH order may include an index to the table that points to an entry corresponding to the desired combination of activated carrier frequencies.

FIG. 5 illustrates an exemplary scenario utilizing two downlink carriers and a single uplink carrier (e.g., as in DC-HSDPA). In FIG. 5, on the left, an initial state is illustrated, wherein downlink carriers 502 and 504 are being sent by a Node B on adjacent frequencies F1 and F2, and an uplink carrier 506 is being sent by a UE on frequency F2. Here, the downlink carrier 504 and the uplink carrier 506 on frequency F2 are anchor carriers, and the downlink carrier 502 on frequency F1 is a secondary carrier. In the context of the present disclosure, when it is said that two carrier frequencies are adjacent to one another, it is meant that the respective carriers are spaced in frequency without another carrier in between. For example, in an exemplary HSPA system, adjacent carriers on either the uplink or the downlink are generally spaced apart by about 5 MHz, although other carrier spacing may be utilized in accordance with aspects of the present disclosure.

In an aspect of the disclosure, a UE utilizing the illustrated carrier scheme receives preconfiguration information on a Level 3 RRC message, including information adapted to enable the UE to be configured to utilize a third downlink carrier 508 on frequency F3. Thus, upon receiving an HS-SCCH order from a Node B adapted to instruct the UE to change its downlink carrier, the initial secondary downlink carrier 502 on frequency F1 may be deactivated, and a subsequent secondary downlink carrier 508 may be activated relatively quickly by virtue of the preconfiguration.

Here, the anchor carrier 504 for the downlink remains unchanged, and the subsequent secondary downlink carrier 508 is adjacent to the anchor carrier 504 but on the other side. For example, if F1 were the next adjacent carrier having a lower frequency than the anchor carrier 504, then F3 would be the next adjacent carrier having a higher frequency than the anchor carrier 504. Of course, other particular schemes may be utilized within the scope of this disclosure.

In an alternative illustrated at the bottom-right of FIG. 5, the secondary carrier 502 in frequency F1 may be deactivated without activating a subsequent secondary downlink carrier. Thus, an HS-SCCH order may instruct the UE to simply deactivate its secondary carrier. In the illustrated example, this results in a single carrier being utilized on the downlink. Such a course of action may take place, for example, to save battery life of the UE, or if only low throughput is needed for the particular information being sent over the air interface that does not require the dual downlink carriers. In any event, it is seen that the results of the HS-SCCH order may be flexible and may enable the changing or deactivation of a secondary carrier.

Figure 6:
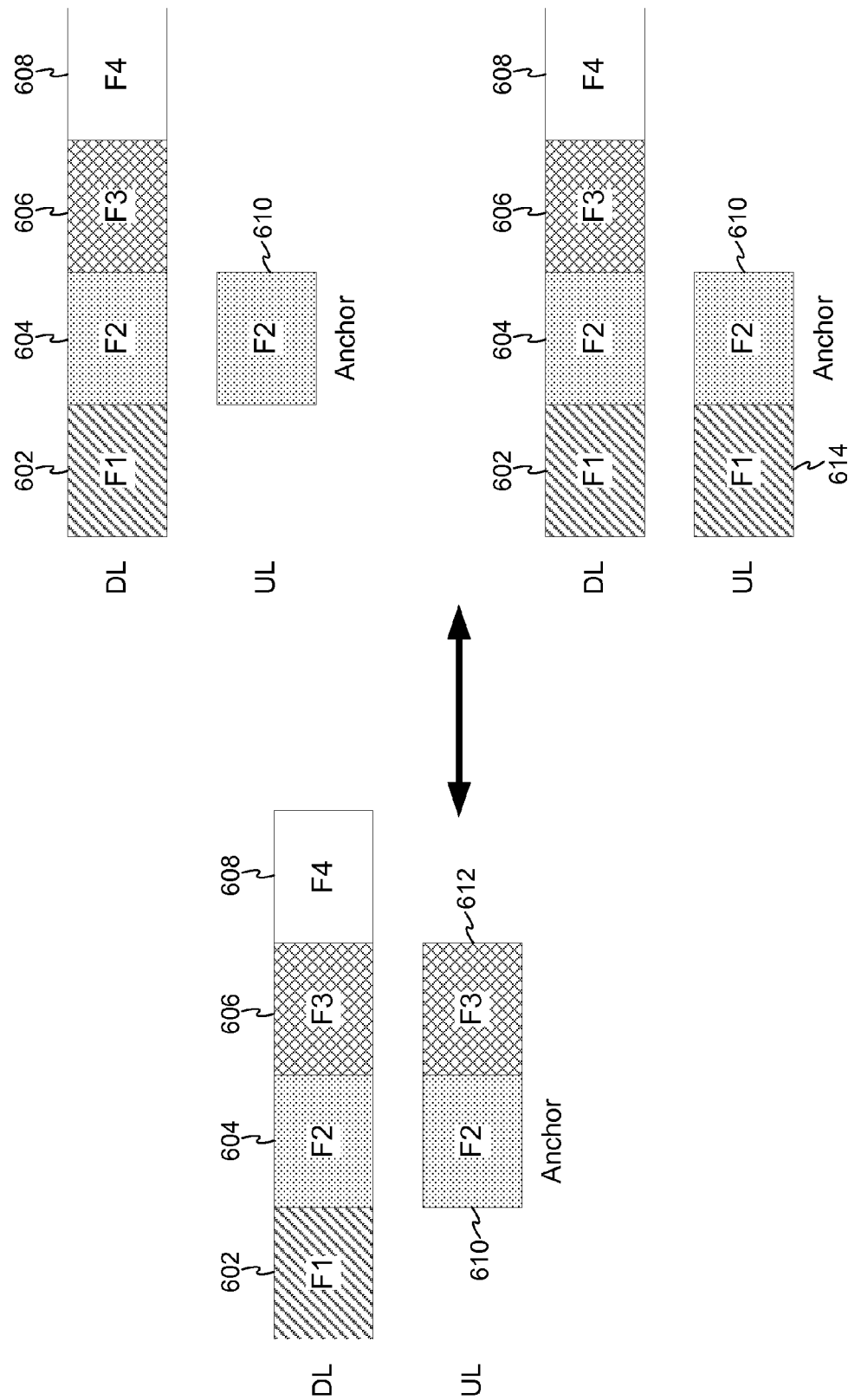
FIG. 6 is a conceptual diagram illustrating a dynamic uplink carrier change in a 4C-HSDPA system.

FIG. 6 illustrates two examples of dynamic uplink carrier activation and deactivation in a system utilizing up to four downlink carriers and up to two uplink carriers. In FIG. 6, an air interface utilizes four downlink carriers 602, 604, 606, and 608, on frequencies F1, F2, F3, and F4, respectively, and two uplink carriers 610 and 612 on frequencies F2 and F3, respectively. In this example, frequency F2 carries the anchor carriers 604 and 610 on the downlink and the uplink, respectively. Similar to the scenario described above and illustrated in FIG. 5, the UE receives preconfiguration message including information adapted to enable the UE to be configured to utilize a third uplink carrier 614 on frequency F1. Here, the preconfiguration message may include information to enable the UE to configure a control channel such as the F-DPCH for controlling a power of the secondary uplink carrier. Thus, upon receiving an HS-SCCH order from a Node B adapted to instruct the UE to change its uplink carrier, the initial secondary uplink carrier 612 on frequency F3 may be deactivated, and a subsequent secondary uplink carrier 614 may be activated relatively quickly by virtue of the preconfiguration.

Here, the anchor carrier 610 for the uplink remains unchanged, and the subsequent secondary uplink carrier 614 is adjacent to the anchor carrier 610 but on its other side. In an alternative illustrated at the top-right of FIG. 6, the secondary uplink carrier 612 in frequency F3 may be deactivated without activating a subsequent secondary uplink carrier. Of course, this is only one example, and in other aspects of the disclosure, any number of the uplink and downlink carriers may be changed in a similar fashion as described herein with relation to FIGS. 5 and 6 by utilizing preconfiguration and an HS-SCCH order to relatively quickly change the respective carrier.

Figure 7:
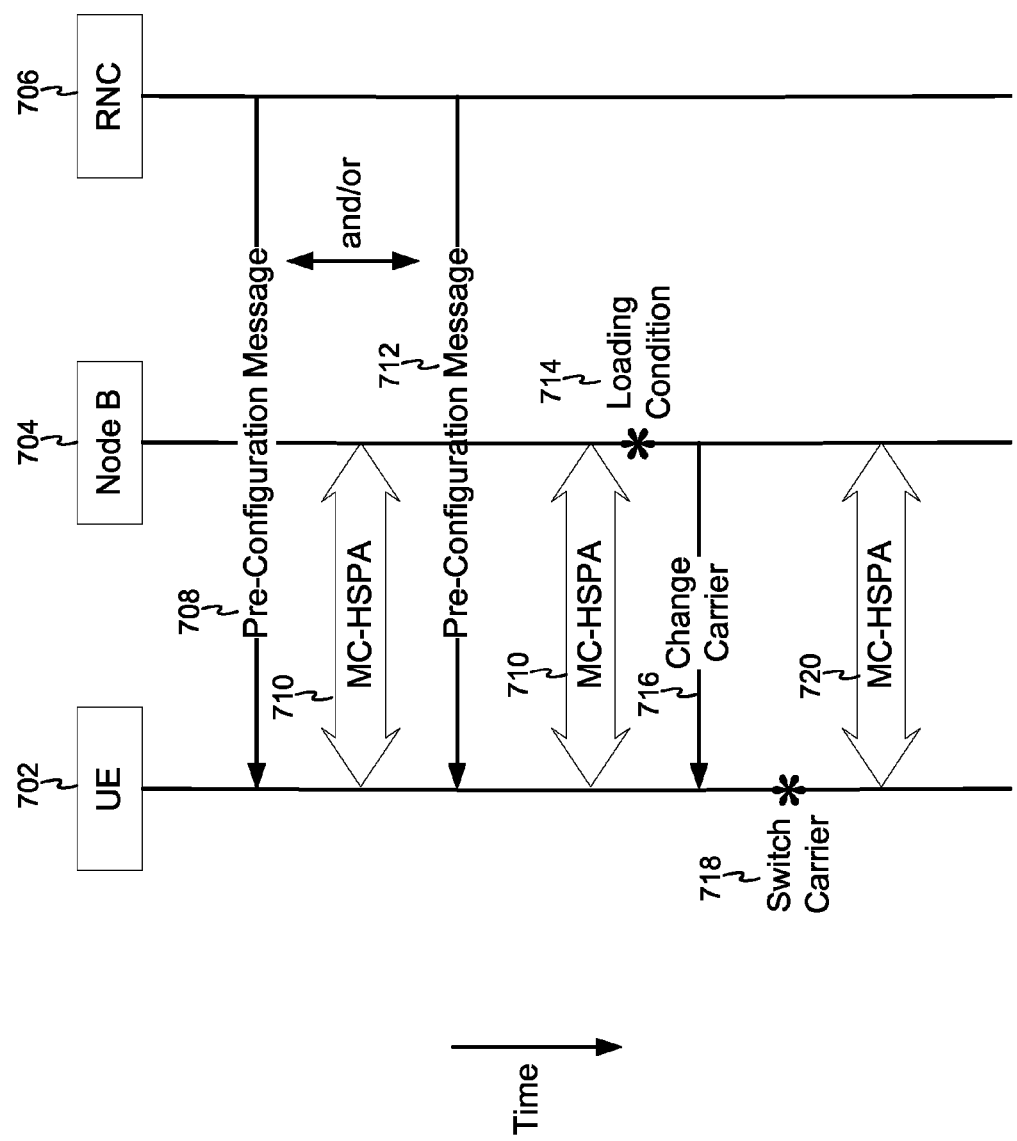
FIG. 7 is a call flow diagram illustrating a process of dynamically changing an uplink carrier in accordance with an aspect of the disclosure.

FIG. 7 is a call flow diagram illustrating a process for dynamic load balancing in accordance with an exemplary aspect of the disclosure. Here, a UE 702 is in communication with a radio network subsystem including a Node B 704 and an RNC 706. The UE in this example is configured for multi-carrier HSPA (MC-HSPA), which may include four downlink carriers and two uplink carriers, although other numbers and combinations of carriers can be utilized. The RNC may provide a preconfiguration message 708 to the UE, utilizing a layer 3 message, such as an RRC message. Here, a preconfiguration message 708 is illustrated as occurring prior to MC-HSPA communication 710 over an air interface between the UE 702 and the Node B 704, however this initial preconfiguration message 708 is optional. The preconfiguration message 708 may be adapted to configure the UE 702 to utilize at least one subsequent carrier to which the UE can switch upon the receipt of a corresponding HS-SCCH order, as described below. A second preconfiguration message 712 is illustrated following the initial MC-HSPA communication 710, although this second preconfiguration message 712 is also optional. Here, the second preconfiguration message 712 may be adapted to configure the UE 702 to utilize a subsequent carrier frequency to which the UE 702 can change its secondary carrier upon the receipt of a corresponding HS-SCCH order. The Node B 704 at some point in time may determine a loading condition 714 that causes a decision to be made to dynamically change a carrier used by the UE 702, for example, to balance a call loading on multiple carriers. Thus, the Node B 704 provides an order 716, e.g., an HS-SCCH order, instructing the UE 702 to change a carrier. The UE then switches its carrier 718 in accordance with the subsequent carrier configured in accordance with the preconfiguration message 712. The UE then resumes its MC-HSPA communication 720 utilizing the new carrier configuration.

In order to determine the conditions under which a carrier should be switched as described above, a number of different metrics may be utilized. For example, to determine whether to switch an uplink carrier, the Node B may look at a System Information Block (SIB). A Node B may be configured to look at the SIBs to determine the loading of the various carriers being utilized and can thereby determine to send appropriate HS-SCCH orders to one or more UEs to dynamically change uplink carriers in accordance with their respective preconfiguration. In order to determine whether to switch a downlink carrier, the Node B may simply look at the number of UEs that are currently utilizing a particular carrier frequency, and based on this information may decide to provide appropriate HS-SCCH orders to one or more UEs to dynamically change downlink carriers in accordance with their respective preconfiguration.

Figure 8:
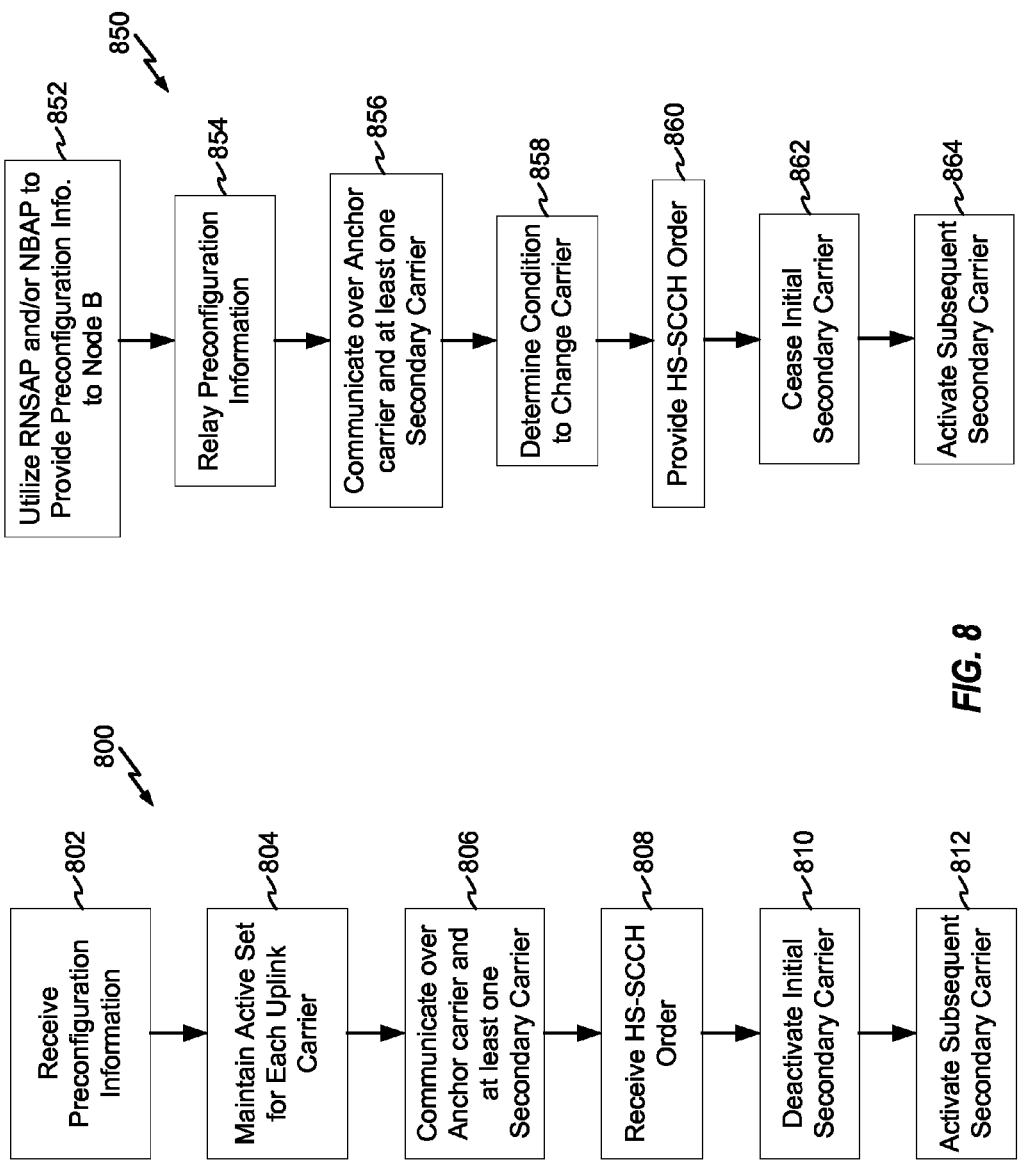
FIG. 8 is a flow chart illustrating two exemplary processes of dynamically changing carriers in accordance with various aspects of the disclosure.

FIG. 8 is a conceptual diagram including two flow charts illustrating exemplary processes 800 and 850 in accordance with certain aspects of the disclosure. Process 800 is an exemplary process wherein an uplink carrier is changed from an initial secondary carrier to a subsequent secondary carrier. Here, block 802 includes receiving preconfiguration information at a UE, which the UE may then utilize to preconfigure communication over a plurality of carriers, including an anchor carrier and at least one initial secondary carrier to be utilized, as well as at least one subsequent secondary carrier to which a relatively rapid switching may occur upon receiving the order. In an example where it is an uplink carrier to be changed, the preconfiguration information may be adapted to further preconfigure a control channel such as the F-DPCH to enable suitable control of the uplink transmission power. Here, the preconfiguration information may be provided over the air interface, being relayed by a Node B in the form of an RRC reconfiguration message, an Active Set Update, or any other suitable message format. In block 804, the UE maintains an Active Set for each uplink carrier, including at least the anchor carrier, the initial secondary carrier, and the subsequent secondary carrier. In block 806, the UE communicates with the Node B over the air interface utilizing the anchor uplink carrier and the initial secondary uplink carrier. Of course, in an example where it is a downlink that is to be changed, the UE also utilizes at least one initial secondary downlink carrier. In any event, at least the anchor downlink carrier and anchor uplink carrier are utilized herein. In block 808, the UE receives an HS-SCCH order from the Node B adapted to instruct the UE to change its carrier. In this example, the order instructs the UE to change its secondary uplink carrier. In response to the order, in block 810, the UE deactivates its initial secondary uplink carrier, and in block 812, activates the subsequent secondary uplink carrier. Of course, in an example that changes a downlink carrier, similar procedures would take place with respect to the initial and secondary downlink carriers.

Process 850 is an example of a process from the network side of the air interface. Here, in block 852, an RNSAP and/or NBAP protocol is utilized to provide preconfiguration information from an RNC or other node to the Node B, and in block 854, that preconfiguration information is relayed to the UE utilizing the air interface. The preconfiguration information is adapted to enable the UE to be preconfigured for the planned dynamic carrier switching if needed for load balancing. In block 856, the Node B communicates with the UE over the air interface utilizing an anchor carrier and at least one secondary carrier. In block 858, the Node B determines a condition under which a decision is made to change a carrier being utilized for the communication over the air interface. For example, if a call loading on a carrier being utilized is too high, and a preconfigured carrier has available capacity for a change. In block 860, the Node B provides an HS-SCCH order to instruct the UE to change its carrier. In block 862, the Node B ceases communication on the initial secondary carrier, and in block 864, the Node B activates the subsequent secondary carrier. Subsequent to these processes, the UE and Node B can commence communication over the air interface utilizing the anchor carrier and the subsequent secondary carrier.

Referring once again to FIG. 4, In one configuration, the apparatus 450 for wireless communication includes means for receiving preconfiguration information, means for maintaining an active set for each uplink carrier, means for communicating over an anchor carrier and at least one initial secondary carrier, means for receiving an order to change the at least one initial secondary carrier, means for at least one of deactivating the at least one initial secondary carrier, or activating at least one subsequent secondary carrier, in response to the order, and means for activating a subsequent secondary carrier in response to the order. In one aspect, the aforementioned means may be the processor(s) 460, 470, 494, 490, 482, and/or 480, the transmitter 456, or the receiver 454, configured to perform the functions recited by the aforementioned means. In another aspect, the aforementioned means may be a module or any apparatus configured to perform the functions recited by the aforementioned means. In another configuration, the apparatus 410 for wireless communication includes means for utilizing RNSAP and/or NBAP to provide preconfiguration information to a Node B; means for relaying the preconfiguration information to a UE; means for communicating over an anchor carrier and at least one secondary carrier; means for determining a condition to change at least one of the secondary carriers; means for transmitting an order to change the at least one initial secondary carrier; means for at least one of ceasing communication over the at least one initial secondary carrier, or activating at least one additional secondary carrier; and means for activating the subsequent secondary carrier in response to the order. In one aspect, the aforementioned means may be the processor(s) 420, 430, 440, 444, 446, 438, and/or 436, the transmitter 432, the receiver 435, the data source 412, or the data sink 439, configured to perform the functions recited by the aforementioned means. In another aspect, the aforementioned means may be a module or any apparatus configured to perform the functions recited by the aforementioned means.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication at a user equipment (UE), comprising:
   communicating over an anchor carrier and at least one initial secondary carrier;
   receiving an order to change the at least one initial secondary carrier; and
   deactivating the at least one initial secondary carrier and activating at least one subsequent secondary carrier, in response to the order, wherein pre-configuration information of the at least one subsequent secondary carrier is received at the UE from a radio network controller (RNC) via a radio resource control (RRC) reconfiguration message prior to the receiving of the order, and wherein an active set is maintained for the subsequent secondary carrier at the UE prior to the receiving of the order, and
   wherein the at least one initial secondary carrier and the at least one subsequent secondary carrier are adjacent to each other, and
   wherein the order to change is received from a base station in the form of a High Speed-Shared Control Channel (HS-SCCH) order and is at least based on load imbalance on secondary carriers determined by the base station.

2. The method of claim 1, wherein the communicating comprises transmitting on an uplink,
   wherein the at least one initial secondary carrier comprises one secondary uplink carrier, and
   wherein the pre-configuration information is adapted to pre-configure a control channel for controlling a power of the subsequent secondary uplink carrier.

3. The method of claim 2, further comprising maintaining an active set for each of the pre-configured uplink carriers.

4. A method of wireless communication at a base station, comprising:
   communicating with a user equipment (UE) over an anchor carrier and at least one initial secondary carrier;
   transmitting an order to change the at least one initial secondary carrier; and
   ceasing communication over the at least one initial secondary carrier and activating at least one additional secondary carrier, wherein pre-configuration information of the at least one additional secondary carrier is transmitted to the UE prior to the transmitting of the order, and wherein an active set is maintained for the additional secondary carrier at the UE prior to the transmitting of the order, and
   wherein the at least one initial secondary carrier and the at least one additional secondary carrier are adjacent to each other, and wherein the order to change is transmitted from the base station in the form of a High Speed-Shared Control Channel (HS-SCCH) order and is at least based on load imbalance on secondary carriers determined at the base station.

5. The method of claim 4, wherein the communicating comprises receiving on an uplink,
wherein the at least one initial secondary carrier comprises one secondary uplink carrier, and
wherein the pre-configuration information is adapted to preconfigure a control channel for controlling a power of the additional secondary uplink carrier.

6. The method of claim 4, further comprising determining to change the at least one initial secondary carrier upon satisfaction of a condition, wherein the condition is based on at least one of load imbalance among a plurality of carriers, uplink noise rise measurements, downlink power, and a number of simultaneous connections utilizing the anchor carrier.

7. The method of claim 6, wherein the condition is based on load imbalance among a plurality of carriers, and wherein the load imbalance is based on a determination of what portion of transmission time intervals is empty on the plurality of carriers.

8. An apparatus for wireless communication at a user equipment (UE), comprising:
means for communicating over an anchor carrier and at least one initial secondary carrier;
means for receiving an order to change the at least one initial secondary carrier; and
means for activating at least one subsequent secondary carrier in response to the order, wherein pre-configuration information of the at least one subsequent secondary carrier is received at the UE from a radio network controller (RNC) via a radio resource control (RRC) reconfiguration message prior to the receiving of the order, and wherein an active set is maintained for the subsequent secondary carrier at the UE prior to the receiving of the order, and
wherein the at least one initial secondary carrier and the at least one subsequent secondary carrier are adjacent to each other, and
wherein the order to change is received from a base station in the form of a High Speed-Shared Control Channel (HS-SCCH) order and is at least based on load imbalance on secondary carriers determined by the base station.

9. The apparatus of claim 8, wherein the means for communicating comprises means for transmitting on an uplink,
wherein the at least one initial secondary carrier comprises one secondary uplink carrier, and
wherein the pre-configuration information is adapted to pre-configure a control channel for controlling a power of the subsequent secondary uplink carrier.

10. The apparatus of claim 9, further comprising means for maintaining an active set for each of the pre-configured uplink carriers.

11. An apparatus for wireless communication at a base station, comprising:
means for communicating with a user equipment (UE) over an anchor carrier and at least one initial secondary carrier;
means for transmitting an order to change the at least one initial secondary carrier; and
means for ceasing communication over the at least one initial secondary carrier and activating at least one additional secondary carrier, wherein pre-configuration information of the at least one additional secondary carrier is transmitted to the UE prior to the transmitting of the order, and wherein an active set is maintained for the additional secondary carrier at the UE prior to the transmitting of the order, and
wherein the at least one initial secondary carrier and the at least one additional secondary carrier are adjacent to each other, and
wherein the order to change is transmitted from the base station in the form of a High Speed-Shared Control Channel (HS-SCCH) order and is at least based on load imbalance on secondary carriers determined at the base station.

12. The apparatus of claim 11, wherein the means for communicating comprises means for receiving on an uplink,
wherein the at least one initial secondary carrier comprises one secondary uplink carrier, and
wherein the pre-configuration information is adapted to pre-configure a control channel for controlling a power of the additional secondary uplink carrier.

13. The apparatus of claim 11, further comprising means for determining to change the at least one initial secondary carrier upon satisfaction of a condition, wherein the condition is based on at least one of load imbalance among a plurality of carriers, uplink noise rise measurements, downlink power, and a number of simultaneous connections utilizing the anchor carrier.

14. The apparatus of claim 13, wherein the condition is based on load imbalance among a plurality of carriers, and wherein the load imbalance is based on a determination of what portion of transmission time intervals is empty on the plurality of carriers.

15. A computer program product at a user equipment (UE), comprising:
a non-transitory computer-readable medium comprising code for:
communicating over an anchor carrier and at least one initial secondary carrier;
receiving an order to change the at least one initial secondary carrier; and
ceasing communication over the at least one initial secondary carrier and activation of at least one additional secondary carrier, wherein pre-configuration information of the at least one subsequent secondary carrier is received at the UE from a radio network controller (RNC) via a radio resource control (RRC) reconfiguration message prior to the receiving of the order, and wherein an active set is maintained for the subsequent secondary carrier at the UE prior to the receiving of the order, and
wherein the at least one initial secondary carrier and the at least one subsequent secondary carrier are adjacent to each other, and
wherein the order to change is received from a base station in the form of a High Speed-Shared Control Channel (HS-SCCH) order and is at least based on load imbalance on secondary carriers determined by the base station.

16. A computer program product at a base station, comprising:
a non-transitory computer-readable medium comprising code for:
communicating with a user equipment (UE) over an anchor carrier and at least one initial secondary carrier;
transmitting an order to change the at least one initial secondary carrier; and ceasing communication over the at least one initial secondary carrier and activating at least one additional secondary carrier, wherein pre-configuration information of the at least one additional secondary carrier is transmitted to the UE prior to the transmitting of the order and wherein an active set is maintained for the additional secondary carrier at the UE prior to the transmitting of the order, and wherein the at least one initial secondary carrier and the at least one additional secondary carrier are adjacent to each other, and wherein the order to change is transmitted from the base station in the form of a High Speed-Shared Control Channel (HS-SCCH) order and is at least based on load imbalance on secondary carriers determined at the base station.

17. An apparatus for wireless communication at a user equipment (UE), comprising:
at least one processor; and
a memory coupled to the at least one processor,
wherein the at least one processor is configured to:
communicate over an anchor carrier and at least one initial secondary carrier;
receive an order to change the at least one initial secondary carrier; and
deactivate the at least one initial secondary carrier and activate at least one subsequent secondary carrier, in response to the order, wherein pre-configuration information of the at least one subsequent secondary carrier is received at the UE from a radio network controller (RNC) via a radio resource control (RRC) reconfiguration message prior to the receiving of the order, and wherein an active set is maintained for the subsequent secondary carrier at the UE prior to receiving of the order, and wherein the at least one initial secondary carrier and the at least one subsequent secondary carrier are adjacent to each other, and wherein the order to change is received from a base station in the form of a High Speed-Shared Control Channel (HS-SCCH) order and is at least based on load imbalance on secondary carriers determined by the base station.

18. An apparatus for wireless communication at a base station, comprising:
at least one processor; and
a memory coupled to the at least one processor,
wherein the at least one processor is configured to:
communicate over an anchor carrier and at least one initial secondary carrier;
provide an order to change the at least one initial secondary carrier; and
at least one of cease communication over the at least one initial secondary carrier, or activate at least one additional secondary carrier, wherein the pre-configuration information of at least the one additional secondary carrier is transmitted to the UE—prior to the providing of the order, and wherein an active set is maintained for the additional secondary carrier at the UE prior to providing of the order, and wherein the at least one initial secondary carrier and the at least one additional secondary carrier are adjacent to each other, and wherein the order to change is provided from the base station in the form of a High Speed-Shared Control Channel (HS-SCCH) order and is at least based on load imbalance on secondary carriers determined at the base station.

\* \* \* \* \*